(12) United States Patent
Uchiyama et al.

(10) Patent No.: US 6,296,400 B1
(45) Date of Patent: Oct. 2, 2001

(54) INTEGRATED FIBER OPTIC BULKHEAD RECEPTACLE

(75) Inventors: Gordon S. Uchiyama, Cerritos; David H. Boger, Redondo Beach; Anastacio Paredes, Santa Paula, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/314,771

(22) Filed: May 19, 1999

(51) Int. Cl.[7] .................................................... G02B 6/04
(52) U.S. Cl. ................................ 385/94; 385/92; 385/93
(58) Field of Search ................................ 385/940, 93, 92

(56) References Cited

U.S. PATENT DOCUMENTS

| | | |
|---|---|---|
| 3,790,791 | 2/1974 | Anderson . |
| 4,065,203 * | 12/1977 | Goell et al. ............................. 385/94 |
| 4,199,222 * | 4/1980 | Ikushima et al. ....................... 385/93 |
| 4,204,306 | 5/1980 | Makuch . |
| 4,383,731 * | 5/1983 | Simon et al. ........................... 385/92 |
| 4,386,268 * | 5/1983 | Kock ...................................... 385/94 |
| 4,386,821 * | 6/1983 | Simon et al. ........................... 385/94 |
| 4,696,538 | 9/1987 | Despouys . |
| 4,711,517 | 12/1987 | Fentress et al. . |
| 4,804,243 | 2/1989 | Borsuk et al. . |
| 4,974,924 | 12/1990 | Okada et al. . |
| 5,052,768 | 10/1991 | Matumoto et al. . |
| 5,052,774 | 10/1991 | Bulman et al. . |
| 5,096,276 | 3/1992 | Gerace et al. . |
| 5,146,525 | 9/1992 | Tabone . |
| 5,216,733 | 6/1993 | Nagase et al. . |
| 5,231,686 | 7/1993 | Rabinovich . |
| 5,276,752 | 1/1994 | Gugelmeyer et al. . |
| 5,315,680 * | 5/1994 | Musk et al. ............................. 385/92 |
| 5,390,269 | 2/1995 | Palecek et al. . |
| 5,621,835 | 4/1997 | Takahashi et al. . |
| 5,621,836 | 4/1997 | Schofield et al. . |
| 5,644,673 | 7/1997 | Patterson . |
| 5,717,802 | 2/1998 | Briggs et al. . |
| 5,796,898 | 8/1998 | Lee . |

OTHER PUBLICATIONS

Soon Jang, "Packaging of photonic devices using laser welding," Oct. 1995, pp. 138–149, SPIE, vol. 2610.
Advertisement of an optoelectric package utilizing a detachable connector, Laser & Optics Magazine, Feb. 15, 1998, p. 15, Coherent Semiconductor Group.

* cited by examiner

Primary Examiner—Jon Henry
(74) Attorney, Agent, or Firm—Harness, Dickey & Pierce, P.L.C.

(57) ABSTRACT

A packaging assembly (10) for a photonic device (12) including a bulkhead connector (40) that eliminates the fiber pigtail in the prior art. The photonic device (12) is mounted within a cavity (14) of a housing (16) and is optically aligned with a lensed end (18) of a fiber (20). The fiber (20) extends into and is soldered to a cylindrical ferrule (24). The fibered ferrule (24) is positioned within an opening (28) extending through an outer wall (30) of the housing (16) so that it extends outside of the housing (16). The ferrule (24) is soldered to the housing (16) in a hermetic seal. The bulkhead connector (40) is mounted to the housing (16) in a position where the fibered ferrule (24) extends partially into a bore (60) extending through the connector (40). An optical connector (64) attaches to the connector (40) so that a fiber (68) extending from the optical connector (64) is inserted in the bore (60) and aligns with the fibered ferrule (24).

14 Claims, 2 Drawing Sheets

INTEGRATED FIBER OPTIC BULKHEAD RECEPTACLE

BACKGROUND OF THE INVENTION

1. Field of the Invention

This invention relates generally to a packaging assembly for a photonic device and, more particularly, to a packaging assembly for a photonic device that includes a fiber bulkhead connector mounted to the assembly housing, and a fibered ferrule hermetically sealed to the assembly housing and extending into the connector.

2. Discussion of the Related Art

Certain photonic devices having small active areas, such as photodetectors, laser diodes and optical modulators, are sometimes mounted within a cavity of a housing as part of a device packaging assembly. For high frequency applications (>1 GHz), a detachable connector is needed for single mode or polarization maintaining fiber at 1310/1550 nm wavelengths to a hermetic package. An optical fiber is coupled to the photonic device to transmit optical signals applied to or generated by the device through the housing. The end of the optical fiber proximate the photonic device typically includes a fiber lens for efficient optical coupling between the photonic device and the fiber to reduce optical losses. The fiber extends through the housing and is attached to a specialized connector adaptor, such as an FIS connector adaptor. The end of the fiber positioned within the connector adaptor is typically a bare fiber that is polished. The connector adaptor can be attached to a connector in a threaded or snap-fit engagement that aligns the polished end of the fiber with another fiber to connect the photonic device to an optical system.

The known packaging assemblies for a photonic device generally include a length of fiber extending from the housing that is attached to the connector adaptor. This length of fiber is referred to in the art as a fiber pigtail. Typically, this fiber pigtail is >1 foot in length. The fiber pigtail is a weak link in the packaging of the photonic device because it has a tendency to be easily damaged or broken. When the fiber pigtail breaks or becomes defective, the entire packaging assembly, including the photonic device, becomes useless and must be replaced. Therefore, the fiber pigtail is a source of increased cost and unreliability for the optical system.

The lensed end of the fiber must be optically aligned with the photonic device. Sometimes the photonic device must support single mode or polarization maintaining, single mode fibers. In these types of applications, it is typically necessary to align the fiber to the photonic device within the housing with sub-micron to a few microns in accuracy.

What is needed is a packaging assembly for a photonic device that eliminates the fiber pigtail and still makes a suitably optical connection outside of the packaging assembly. It is therefore an object of the present invention to provide such a packaging assembly.

SUMMARY OF THE INVENTION

In accordance with the teachings of the present invention, a packaging assembly for a photonic device is disclosed that employs a bulkhead connector that eliminates the fiber pigtail in the prior art. The photonic device is mounted within a cavity of a housing and is optically aligned with a lensed end of an optical fiber. The fiber extends into and is soldered to a cylindrical ferrule. The fibered ferrule is positioned within an opening through the housing so that it extends outside of the housing. The ferrule is soldered (or welded) to the housing to hermetically seal the opening. The bulkhead connector is mounted to the housing so that the fibered ferrule extends partially into a bore extending through the connector. An optical connector is attached to the bulkhead connector so that a fibered ferrule extending from the optical connector is inserted in the bore and aligns with the fibered ferrule from the housing.

Additional objects, advantages, and features of the present invention will become apparent from the following description and appended claims, taken in conjunction with the accompanying drawings.

DETAILED DESCRIPTION OF THE PREFERRED EMBODIMENTS

The following discussion of the preferred embodiments directed to a packaging assembly for a photonic device is merely exemplary in nature, and is in no way intended to limit the invention or its applications or uses.

Figure 1:
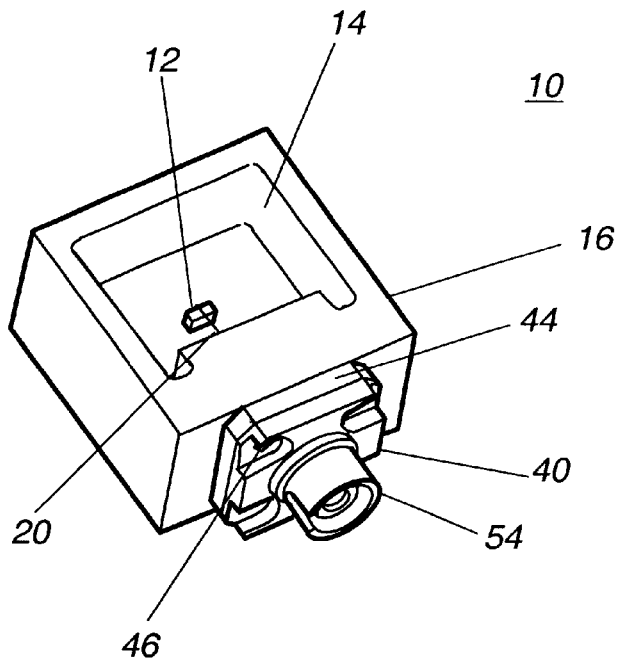
FIG. 1 is a perspective view of a packaging assembly for a photonic device, according to an embodiment of the present invention.
Figure 2:
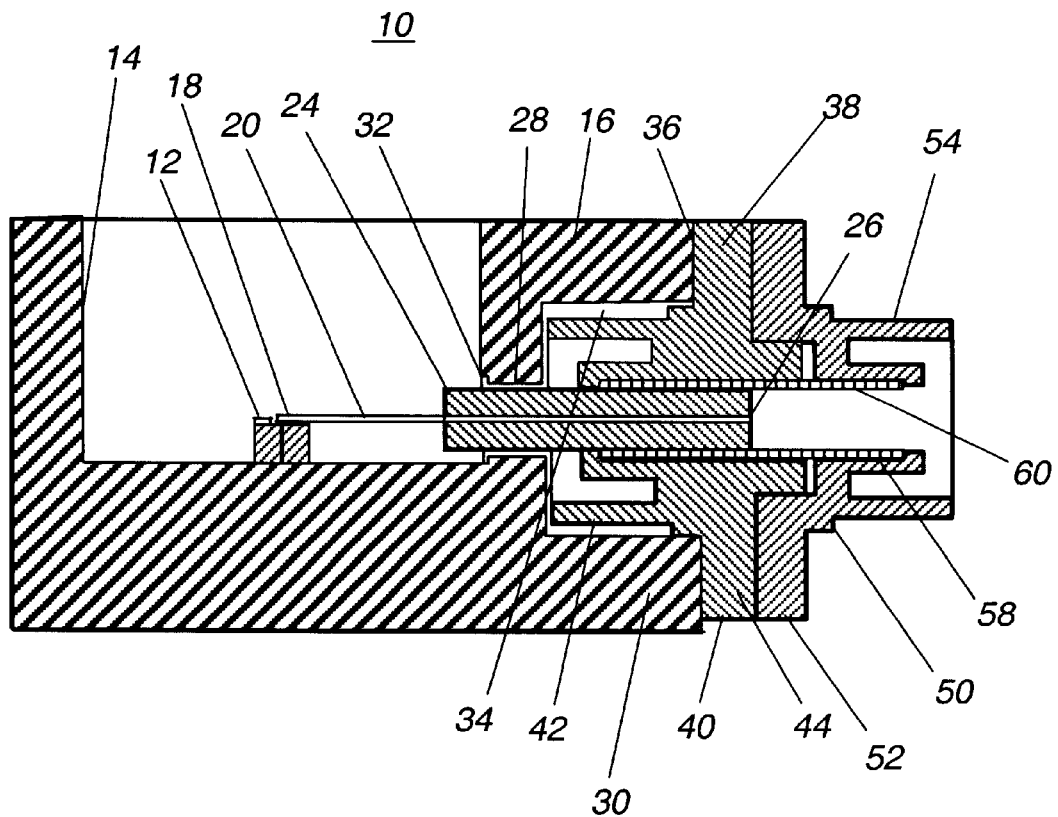
FIG. 2 is a cross-sectional view of the packaging assembly shown in FIG. 1.

FIG. 1 is a perspective view and FIG. 2 is a cross-sectional view of a packaging assembly 10 for a photonic device 12, according to the invention. The photonic device 12 can be any optical device that is to be coupled to a fiber, such as a waveguide, photodetector, laser diode, optical modulator, etc. The device 12 is mounted within a cavity 14 defined in a device housing 16. The cavity 14 would be covered by a suitable housing cover (not shown). A lensed end 18 of a metalized optical fiber 20 is optically coupled to the device 12 within the cavity 14 to allow a high efficiency optical propagation between the device 12 and the fiber 20. The fiber 20 can be aligned to the device 12 by any suitable alignment process.

According to the invention, the fiber 20 extends into a cylindrical ferrule 24 and is soldered therein. The fiber 20 is soldered to the ferrule 24 so that a polished end 26 of the fiber 20 opposite the lensed end 18 of the fiber 20 is substantially flush with an end of the ferrule 24 opposite the cavity 14. One end of the ferrule 24 is positioned in the cavity 14. The remaining length of the ferrule 24 extends through an opening 28 in an end wall 30 of the housing 16 that is sized to accept the ferrule 24 in a slidable, friction-type fit. The ferrule 24 is soldered to the housing 16 at location 32 within the opening 28 around its circumference so that the cavity 14 is hermetically sealed. The housing 16 and the ferrule 24 are made of compliant materials that can be metallized and soldered or welded.

The device 12 is attached within the cavity 14. The fiber 20 is soldered within the bore extending through the ferrule 24, and the ferrule 24 is slid through the opening 28. When the alignment is within predetermined tolerances, the ferrule 24 is then soldered to the housing 16 at the location 32.

A counterbore (recess) recess 34 is formed in an outer surface 36 of the end wall 30 to be larger than and concentric with the opening 28. The ferrule 24 extends through the recess 34 and beyond the outer surface 36 when it is soldered to the housing 16. The recess 34 is sized to accept a mounting portion 38 of a bulkhead connector 40. The bulkhead connector 40 can be any suitable connector for the purposes described herein, such as the FIS connector adaptor. The mounting portion 38 includes an extension 42 extending into the recess 34, and a mounting plate 44 that mounts flush against the surface 36 around the recess 34. The connector 40 includes a connecting portion 50 having a coupling plate 52 and a coupler 54. Any suitable fastener, such as bolts 46 or the like, are used to secure the coupler plate 52 to the mounting plate 44, and the mounting plate 44 to the surface 36.

A tubular alignment sleeve 58 is positioned within a bore 60 that extends through the bulkhead connector 40. The ferrule 24 extends into the sleeve 58 through about half of its length. The sleeve 58 is sized to accept the ferrule 24 in a slidable engagement. The ferrule 24 is not permanently attached to the connector 40, so that if the connector 40 is removed from the housing 16, it slides off of the ferrule 24. The recess 34 allows the connector 40 to slide onto the ferrule 24 after the ferrule 24 has been aligned to the device 12 and soldered to the housing 16.

Figure 3:
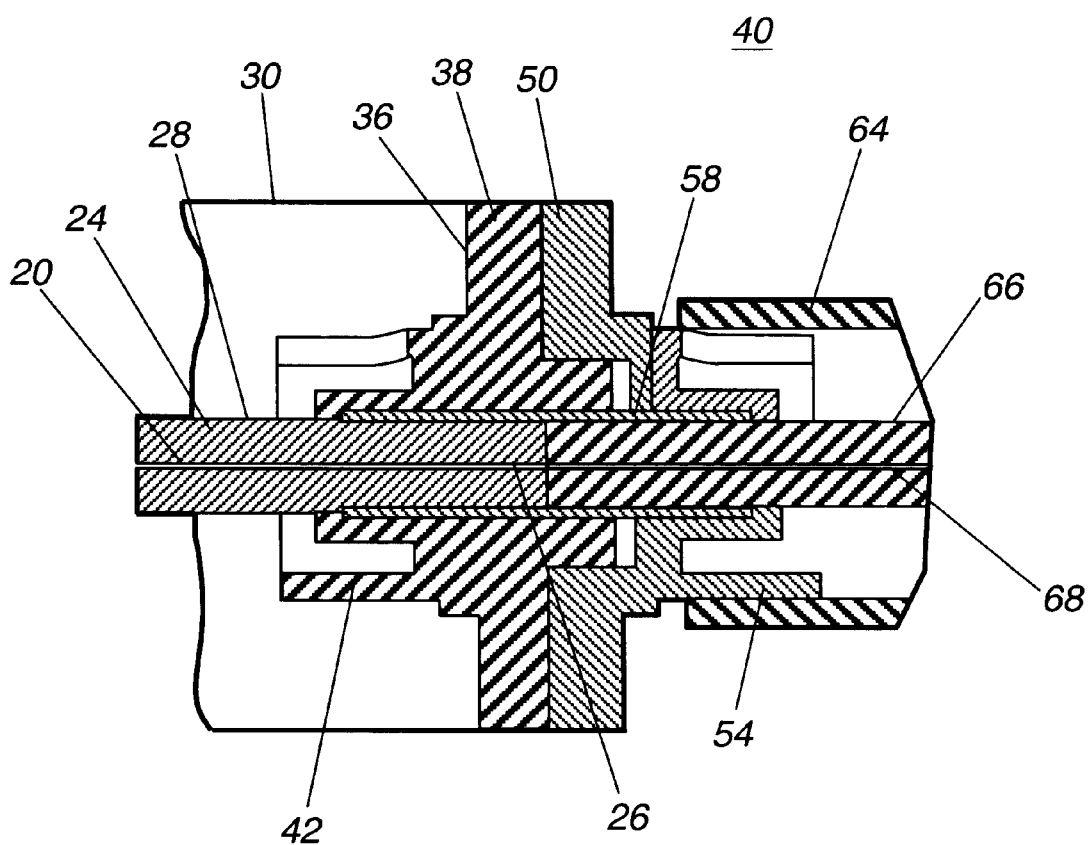
FIG. 3 is a cut-away, cross-sectional view of the packaging assembly shown in FIG. 2 attached to an optical connector.

FIG. 3 is a cross-sectional view of the bulkhead connector 40 connected to an optical connector 64 to optically connect the device 12 to an optical system (not shown). The connector 64 includes a ferrule 66 extending therefrom and having the same diameter as the ferrule 24. A fiber 68 is fixed within the ferrule 66 so that a polished end of the fiber 68 is flush with an end of the ferrule 66. The ferrule 66 is slid into the sleeve 58 through the coupler 54 so that an end of the ferrule 66 is positioned flush against the polished end 26 of the fiber 20 for optical coupling. The sleeve 58 provides the alignment. A spring tension in the mating connector 64 allows the fibers 20 and 68 to abut against each other, and the connectors 40 and 64 are threaded or snapped together for a secure engagement.

Thus, the invention provides a robust packaging assembly for a photonic device, and provides the desired connection from the fiber to an optical system without using a fiber pigtail. The design of the invention does not depend on the connector adaptor to align the fiber 20 to the device 12. Alignment to the device 12 is performed inside the housing 16.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A packaging assembly for a photonic device comprising:
   a housing including a cavity, said device being mounted within the cavity, said housing further including a housing wall and an opening extending from the cavity through the wall;
   an optical device fiber including a first end and a second end, said first end of the fiber being optically coupled to the photonic device within the cavity;
   a ferrule, said ferrule extending from the cavity through the opening to outside the housing, said fiber being positioned within the ferrule; and
   a connector mounted to an outside surface of the housing wall, said connector including an internal bore aligned with the opening, said ferrule extending into and being positioned within the bore in a slidable fit, wherein said connector includes a connection device for detachably securing the connector to the outside surface of the housing so that the connector is removable from the housing and the ferrule is slidably detached from the connector.

2. The assembly according to claim 1 wherein the ferrule is soldered to the wall within the opening in a hermetic seal.

3. The assembly according to claim 1 wherein the fiber is soldered within the ferrule.

4. The assembly according to claim 1 wherein the housing wall includes a recess formed through the outside surface, a portion of said connector being positioned within the recess and said connector being secured to the wall.

5. The assembly according to claim 1 wherein the first end of the fiber is a lensed end and the second end of the fiber is a polished end, said polished end being positioned within the ferrule and being substantially flush with an end of the ferrule.

6. The assembly according to claim 1 wherein the ferrule is positioned within the bore through approximately half of its length, said connector accepting a coupling fiber positioned within the bore that abuts against the ferrule and is optically coupled to the device fiber.

7. A packaging assembly for a photonic device comprising:
   a housing, said device being mounted within the housing, said housing including an opening extending through a housing wall;
   an optical device fiber including a first end and a second end, said first end of the fiber being optically coupled to the photonic device;
   a ferrule, said ferrule extending through the opening from within the housing to outside the housing, said fiber extending into the ferrule and being welded therein and said ferrule being welded to the housing wall within the opening to align the fiber to the photonic device and hermetically seal the housing; and
   a connector adaptor mounted to an outer surface of the housing wall, said connector adaptor including an internal bore aligned with the opening, said ferrule extending into and being positioned within the bore in a slidable fit, said housing wall having a recess formed through the outer surface, said connector adaptor being positioned within the recess, said connector adaptor further including a removable connection device for removing the connector adaptor from the housing where the connector slides off of the ferrule.

8. The assembly according to claim 7 wherein the connector adaptor is an FIS connector adaptor.

9. The assembly according to claim 7 wherein the ferrule is positioned within the bore through approximately half of its length, said connector adaptor accepting a coupling fiber positioned within the bore that abuts against the ferrule and is optically coupled to the device fiber.

10. A method of coupling a photonic device to a connector, said method comprising the steps of:
    mounting the photonic device within a housing;
    welding a length of fiber within a ferrule so that a first end of the fiber extends from the ferrule and a second end of the fiber is positioned within the ferrule; positioning the fibered ferrule in an opening extending through a wall of the housing;

aligning the first end of the fiber to the photonic device;

welding the ferrule to the wall of the housing to provide a hermetic seal; and removably mounting a connector adaptor to the wall of the housing, said step of mounting the connector adaptor to the housing including sliding the ferrule into an axial bore within the connector adaptor so that the connector adaptor can be removed therefrom.

11. The method according to claim 10 wherein the step of mounting a connector adaptor includes mounting a portion of the connector adaptor within a recess formed in an outer surface of the wall of the housing.

12. The method according to claim 10 wherein the step of mounting the connector adaptor includes causing the ferrule to extend about half way through the bore.

13. The method according to claim 10 wherein the step of mounting a connector adaptor includes mounting an FIS connector adaptor.

14. The method according to claim 10 wherein the step of welding a length of fiber includes providing a first lensed end of the fiber extending from the ferrule and a second polished end of the fiber substantially flush with an end of the ferrule.

\* \* \* \* \*